United States Patent [19]

Pickering

[11] 4,170,877
[45] Oct. 16, 1979

[54] RESERVOIR ASSEMBLIES FOR VEHICLE BRAKING SYSTEMS

[75] Inventor: John F. Pickering, West Midlands, England

[73] Assignee: Girling Limited, Birmingham, England

[21] Appl. No.: 724,533

[22] Filed: Sep. 20, 1976

[30] Foreign Application Priority Data

Sep. 23, 1975 [GB] United Kingdom ............... 38896/75

[51] Int. Cl.² ............................................. F15B 7/10
[52] U.S. Cl. ...................................... 60/592; 137/265;
137/574; 220/22
[58] Field of Search ................. 60/585, 592, 535, 545,
60/562; 137/574; 340/52 C; 220/20, 22

[56] References Cited

U.S. PATENT DOCUMENTS

| 3,126,906 | 3/1964 | Touzalin | 137/574 |
|---|---|---|---|
| 3,147,596 | 9/1964 | Wallace | 60/562 |
| 3,560,918 | 2/1971 | Lewis | 340/52 C |
| 3,645,416 | 2/1972 | Main, Jr. | 220/22 |
| 3,691,522 | 9/1972 | Hocking | 340/52 C |
| 3,744,513 | 7/1973 | Leitenberger | 60/562 |
| 3,914,943 | 10/1975 | Lewis | 60/585 |
| 3,969,898 | 7/1976 | Fulmer | 60/592 |
| 3,989,056 | 11/1976 | Reinartz | 137/574 |

FOREIGN PATENT DOCUMENTS 2135576  1/1973  Fed. Rep. of Germany ............ 60/585
1164070  9/1969  United Kingdom ..................... 60/585

Primary Examiner—Martin P. Schwadron
Assistant Examiner—Abraham Hershkovitz
Attorney, Agent, or Firm—Scrivener, Parker, Scrivener & Clarke

[57] ABSTRACT

In a reservoir assembly for a tandem master cylinder of a hydraulic braking system the container is separated into compartments by at least one baffle passages being provided for permitting limited communication between the compartments past the baffle. The arrangement is such that when the container is installed in a vehicle and the brakes are applied, the tendency of fluid to transfer from one compartment to another is resisted. The arrangement also ensures that even under the worst conditions of deceleration and altitude of the vehicle there will be a sufficient volume of fluid in the compartments to cover outlets to the master cylinder and thus sustain subsequent brake application.

12 Claims, 5 Drawing Figures

RESERVOIR ASSEMBLIES FOR VEHICLE BRAKING SYSTEMS

SPECIFIC DESCRIPTION

This invention relates to a new or improved reservoir assembly for a tandem master cylinder of a hydraulic braking system, the reservoir assembly being of the kind comprising a container defined by a continuous wall, a filler opening in the upper end of the wall adapted to be closed by a removable cap, partition means dividing the container into separate compartments so that a single fluid level indicator can be used to indicate the level of fluid within the container, and spaced outlets in the lower end of the wall for connection to separate pairs of recuperation and compensation ports of a tandem master cylinder, the partition means being constructed and arranged to limit the transfer of fluid from one compartment to another during brake application and in response to change in the attitude of a vehicle.

In one known reservoir assembly of the kind set forth the partition means comprises a vertical partition extending between opposite sides of the wall and upstanding from the lower end thereof. A longitudinally elongate passage provided between the compartments is constructed and arranged to ensure that a minimum volume of fluid remains in each compartment sufficient to cover the recuperation and compensation ports communicating with the outlet from that compartment when the vehicle is disposed at a maximum value of inclination, for example 45°, with respect to the horizontal. The passage may comprise a space between a horizontal shelf extending towards opposite front and rear ends of the wall of the container from the upper end of the partition, and the upper end of the wall itself, or an elongate tubular member projecting through the partition toward opposite front and rear ends of the container, with the partition extending between the upper and lower ends of the wall. In such a known assembly during a rapid deceleration, for example a 0.9 g stop, due to the deceleration forces, additional fluid may be transferred through the passage from one compartment to the other with the result that the recuperation and compensation ports communicating with the compartment from which the fluid is transferred, may be uncovered. This is undesirable since brake failure may occur if the brakes are released and then rapidly re-applied during the same braking sequence.

According to our invention in a reservoir assembly of the kind set forth for a tandem master cylinder the partition means comprises at least one baffle which is shaped such that during a brake application the fluid in one compartment creates its own resistance to movement of the fluid.

The container preferably comprises at least two compartments separated by at least one baffle, passage means being provided for permitting limited communication between the compartments past the baffle, the baffle being shaped such that in at least one of the compartments the cross sectional areas on either side of a lateral horizontal line passing through the centre of the outlet port are unequal, the arrangement being such that when the container is installed in a vehicle and the brakes are applied the displacement of the fluid level is insufficient to uncover the outlet port.

The baffle is preferably shaped such that the lateral horizontal width of one of the compartments generally decreases in the direction towards the other compartment.

There may be two compartments in the container separated by a single baffle which is symmetrical with respect to the longitudinal axis of the container.

In a modification three aligned compartments are provided in the container, the adjacent compartments being separated by two spaced baffles. The extra baffle limits fluid displacement when the brakes are applied with the vehicle in reverse. The front and rear compartments with respect to the normal forward direction of travel of the vehicle are preferably each of greater volume than the intermediate compartment.

The, or each, baffle is arranged to provide the compartments of relative proportions such that, even under the worst conditions of deceleration and attitude, with the vehicle travelling in a forward direction, a sufficient volume of fluid will be present in either compartment to sustain a subsequent brake application. This ensures that brakes can be applied even after failure of one brake circuit or loss of fluid as indicated by the liquid level indicator.

In one construction each baffle is of generally U or parabolic outline in plan and extends between the upper and lower ends of the wall of the container. The free ends of the limbs of each baffle are connected to the container substantially where the side portions of the wall intersect one end of the wall. The upper edges of the limbs of the baffle adjacent to their free ends are notched or cut away to provide the passage means.

Two hydraulic reservoir assemblies in accordance with our invention are illustrated in the accompanying drawings, in which.

Figure 1:
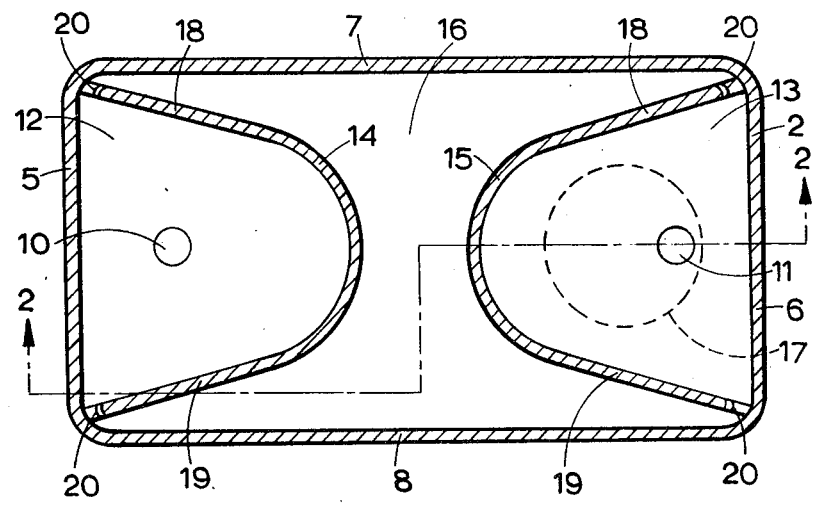
FIG. 1 is a section on the line 1—1 of FIG. 2.
Figure 2:
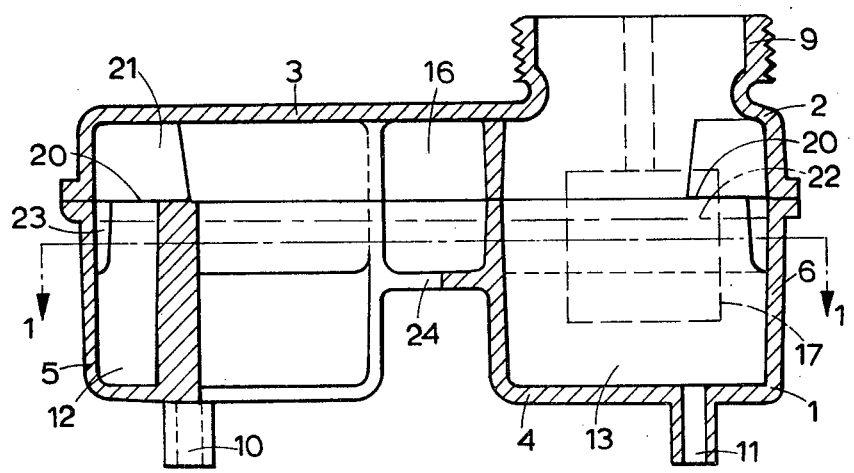
FIG. 2 is a section on the line 2—2 of FIG. 1.

The reservoir assembly illustrated in FIGS. 1 and 2 comprises a lower and upper moulding 1 and 2 of synthetic plastics material which are integrally joined together at their mating faces to define a container for fluid comprising a continuous wall constituted by opposed upper and lower walls, 3, 4 opposed front and rear end walls 5, 6 and opposed side walls 7, 8. A threaded flanged filler opening 9 is provided in the upper wall and is adapted to receive a filler cap (not shown). Spaced outlets 10, 11 are provided in the lower wall 4 for connection to separate pairs of recuperation and compensation ports of a tandem master cylinder (not shown).

The container is divided interiorly into a forward compartment 12, communicating with the outlet 10 and a rear compartment 13, communicating with the outlet 11, by spaced baffles 14 and 15. An intermediate compartment 16 is provided between the baffles 14, 15. The filler opening 9 communicates directly with the compartment 13 and a level indicating device 17 can be inserted through the opening 9 into the compartment 13 as shown in FIG. 2.

The baffles 14, 15 are symmetrically arranged and are oppositely directed. Each baffle 14, 15 is of generally "U" or parabolic outline and includes a pair of limbs 18, 19. The baffles 14, 15 are upstanding between the lower and upper walls 4, 3 of the container and the free ends of the limbs 18, 19 of the respective baffles 14, 15 are integrally connected to the container substantially along its corner edges where the side walls 7, 8 intersect the front and rear end walls 5, 6. The upper edges of the limbs 18, 19 of the baffles 14, 15 at or adjacent to their free ends are notched or cut back as indicated at 20 to provide communication between the compartments. The shape of each of the notches 20 can be seen in FIG. 2 and comprises a large upper area 21 which is located above a normal minimal fluid level line 22 and a comparatively small area 23 which is located below the line 22.

A portion of the lower wall 4 of the container is raised to form a platform 24 between the baffles 14,15. The lower edges of the notches 20 are positioned at substantially the same level above the lower wall 4 as the platform 24 so as to define a chamber below this level in each of the compartments 12, 13. Each chamber contains sufficient fluid to effect a brake application after failure of the brakes supplied from the other compartment. Fluid transfer from one compartment to the other when the fluid level falls below the level of platform 24 will only occur as a result of the inertia effect on the fluid due to deceleration whereby the level of the fluid becomes angular with respect to the horizontal. Due to the shapes of the baffles 14, 15 the fluid transfer from one compartment to another is minimised. Once a low level of fluid has been indicated by the indicating device there will still be sufficient volume present to effect a brake application and bring the vehicle to a standstill, as the shape of the baffle ensures that the fluid level displacement due to deceleration on brake application is insufficient to uncover a brake outlet port.

When the container is mounted in a vehicle on a tandem master cylinder with the forward compartment 12 in advance of the rear compartment, fluid can flow freely into all compartments through the notches 20 at the corners of the reservoir.

Due to the position of the baffle 15 and notches 20, when the brakes are applied, for example rapidly, any tendency for fluid in the rear compartment 13 to flow into the forward compartment 12, is limited by the fluid level being displayed away from the notches 20. Under such conditions a sufficient volume of fluid is present to supply the brakes since the outlets 10 and 11 remain covered. Fluid from the intermediate compartment 16 is transferred to the chamber 12 and fluid is trapped in the chamber 13. Due to the narrowing shape of the baffle 15 the fluid level displacement in the chamber 13 on braking will be insufficient to uncover the outlet port 11.

When the vehicle is travelling in a reverse direction and the brakes are applied, the opposite effect occurs with the baffle 14 being operative.

Figure 3:
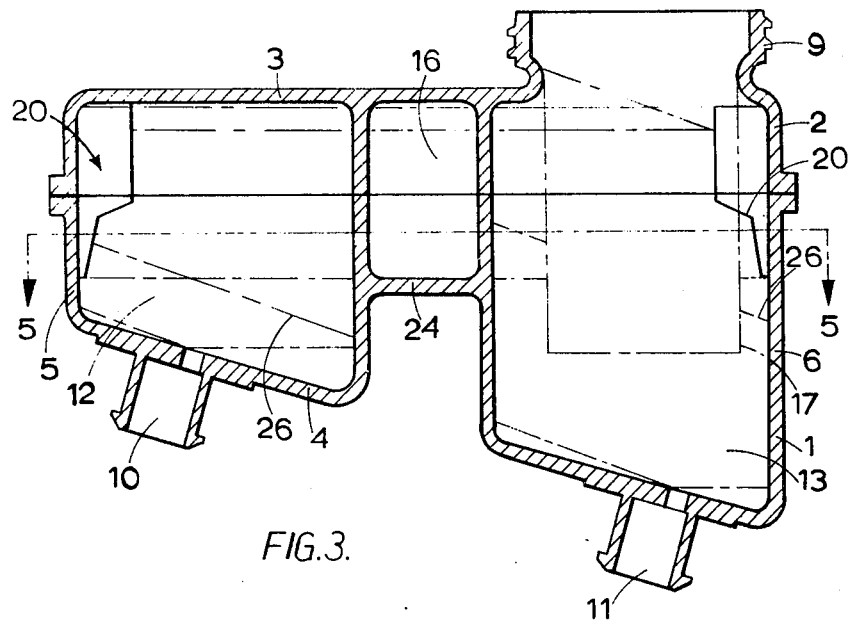
FIG. 3 is a longitudinal section through another reservoir assembly with vehicle travelling on decline.
Figure 4:
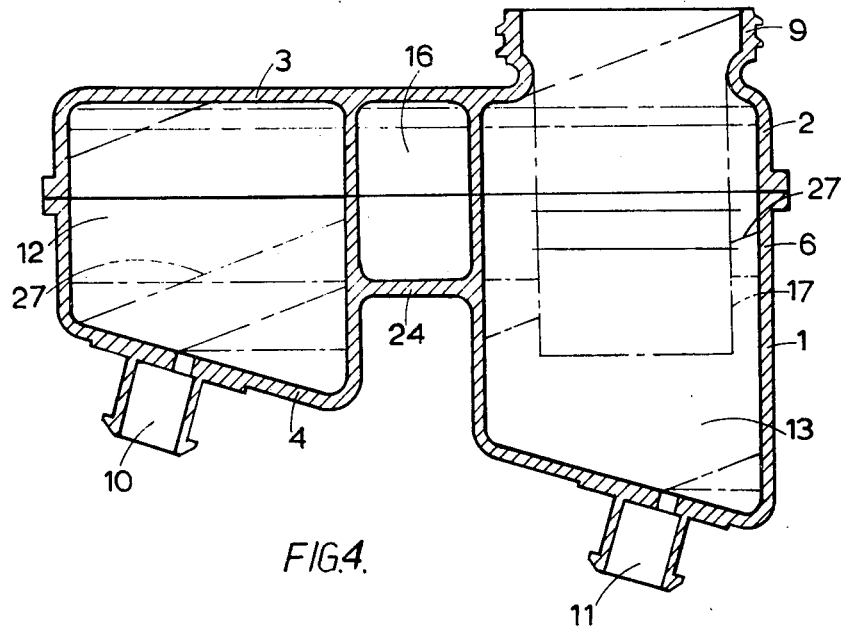
FIG. 4 is a section similar to FIG. 3 with vehicle travelling on incline.
Figure 5:
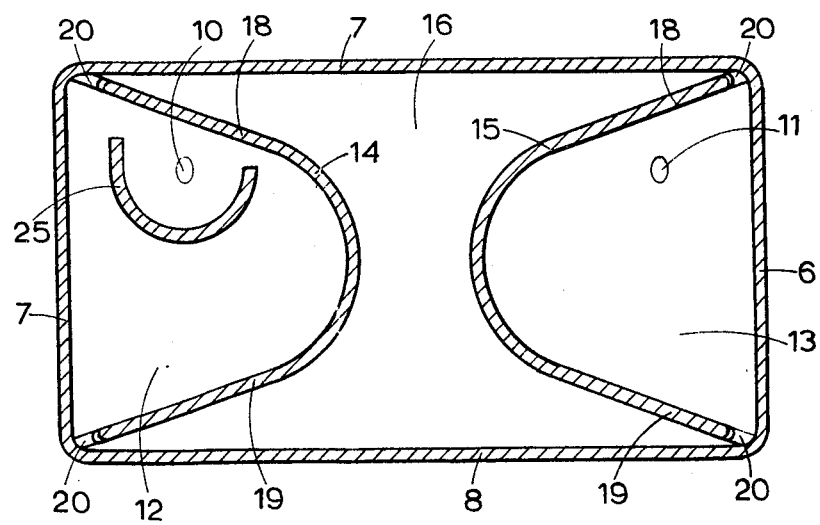
FIG. 5 is a section in the line 5—5 of FIG. 3.

FIGS. 3 to 5 show a reservoir assembly similar to that of FIGS. 1 and 2 and corresponding reference numbers have been used for corresponding parts. In the reservoir assembly of FIGS. 3 to 5, a second baffle 25 of generally semi-circular shape is housed in the compartment 12 upstanding from the base of the wall and surrounding the port 10. The baffle 25 resists movement of the fluid in a lateral direction between the side walls 7, 8.

FIG. 3 shows at 26 the level of fluid when the vehicle is travelling in a forwards direction on a decline of 1-in-3, and FIG. 4 shows at 27 the level of fluid when the vehicle is travelling in a forwards direction on an incline of 1-in-3.

Our invention produces an arrangement which limits the movement of fluid in a container during deceleration and ensures that the fluid level displacement is insufficient to uncover a brake outlet port. This has two advantages: firstly the outlet ports from the container remain covered; and secondly the fluid level indicator does not give a false indication level.

I claim:

1. A reservoir assembly for a tandem master cylinder of an hydraulic braking system, said reservoir assembly comprising a container for hydraulic fluid defined by a continuous wall, said wall including opposed upper and lower ends, opposed front and rear ends and side portions connecting said ends, the upper end of said wall having a filler opening adapted to be closed by a removable cap, partition means dividing the container into separate compartments, said lower end of said wall having spaced outlet ports for connection to separate pairs of recuperation and compensation ports of a tandem master cylinder, said partition means comprising at least one rigid baffle extending between said side portions of said continuous wall from one of said front and rear ends of said wall towards the other of said ends, passage means between said continuous wall and said baffle, and including a portion permitting limited transfer of fluid between said compartments past said baffle, said baffle being shaped such that the lateral horizontal width of one of said compartments generally decreases in a direction towards the other of said compartments over substantially the whole of the length of said one compartment in the longitudinal direction, said passage means being constructed and arranged such that when said container is installed in a vehicle and the brakes are applied transfer of fluid through said passage means from one of said compartments to another is limited to a minimum amount sufficient to prevent any resultant fluid level displacement during said brake application from uncovering one of said outlet ports.

2. A reservoir assembly as claimed in claim 1, wherein a further baffle is positioned in at least one of the compartments and is shaped so as to resist movement of fluid in a lateral direction between side portions of said wall.

3. A reservoir assembly for a tandem master cylinder of an hydraulic braking system for a vehicle, said reservoir assembly comprising a container for hydraulic fluid defined by a continuous wall, said wall including opposed upper and lower ends, opposed front and rear ends relative to the normal forward travel of the vehicle, and side portions connecting said ends, the upper end of said wall having a filler opening adapted to be closed by a removable cap, partition means dividing the container into two compartments, said lower end of said wall having spaced oultet ports for connection to separate pairs of recuperation and compensation ports of a tandem master cylinder, said partition means comprising at least one rigid baffle extending symmetrically with respect to the longitudinal axis of said container between said side portions of said continuous wall from the front end towards the rear end thereof, passage means between the front end of said continuous wall and said baffle, and including a portion permitting limited transfer of fluid between said compartments past said baffle, said baffle being shaped such that the lateral horizontal width of one of said compartments generally decreases in a direction towards the other of said compartments over substantially the whole of the length of said one compartment in the longitudinal direction, said passage means being constructed and arranged such that when said container is installed in a vehicle and the brakes are applied transfer of fluid through said passage means from one of said compartments to the other is limited to a minimum amount sufficient to prevent any resultant fluid level displacement during said brake application from uncovering one of said outlet ports.

4. A reservoir assembly for a tandem master cylinder of an hydraulic braking system for a vehicle, said reservoir assembly comprising a container for hydraulic fluid defined by a continuous wall, said wall including opposed upper and lower ends, opposed front and rear ends relative to the normal forward travel of the vehicle, and side portions connecting said ends, the upper end of said wall having a filler opening adapted to be closed by a removable cap, partition means dividing the container into separate front intermediate and rear compartments, said lower end of said wall having spaced outlet ports for connection to separate pairs of recuperation and compensation ports of a tandem master cylinder, said partition means comprising a pair of spaced rigid baffles extending between said side portions of said continuous wall from front and rear ends of said wall towards the other of said ends, passage means between said continuous wall and said baffles, and including portions permitting limited transfer of fluid between said compartments past said baffles, said baffles being shaped such that the lateral horizontal width of one of said front and rear compartments generally decreases in a direction towards another of said compartments over substantially the whole of the length of said one compartment in the longitudinal direction, said passage means being constructed and arranged such that when said container is installed in a vehicle and the brakes are applied transfer of fluid through said passage means from one of said compartments to another is limited to a minimum amount sufficient to prevent any resultant fluid level displacement during said brake application from uncovering one of said outlet ports.

5. A reservoir assembly as claimed in claim 4, wherein said baffles are shaped such that the lateral horizontal widths of said front and rear compartments decrease in the direction towards the intermediate compartment.

6. A reservoir assembly as claimed in claim 4, wherein said front and rear compartments are of greater volume than said intermediate compartment.

7. A reservoir assembly as claimed in claim 4, wherein a portion of said wall of said container positioned between said baffles is raised towards a spaced opposed portion of said wall to form a platform.

8. A reservoir assembly as claimed in claim 4, wherein said baffles are symmetrical with respect to the longitudinal axis of said container, said container wall having opposed front and rear ends and said passage means are provided by notches between one of said baffles and said front end of said wall and between the other of said baffles and said rear end of said wall.

9. A reservoir assembly for a tandem master cylinder of an hydraulic braking system, said reservoir assembly comprising a container for hydraulic fluid defined by a continuous wall, said wall including opposed upper and lower ends, opposed front and rear ends and side portions connecting said ends, the upper end of said wall having a filler opening adapted to be closed by a removable cap, partition means dividing the container into separate compartments, said lower end of said wall having spaced outlet ports for connection to separate pairs of recuperation and compensation ports of a tandem master cylinder, said partition means comprising at least one rigid baffle extending between said side portions of said continuous wall from one of said front and rear ends of said wall towards the other of said ends, said baffle being of generally U shaped outline in plan and extending between said upper and lower ends of said wall of said container, passage means between said continuous wall and said baffle, and including a portion permitting limited transfer of fluid between said compartments past said baffle, said baffle being shaped such that the lateral horizontal width of one of said compartments generally decreases in a direction towards the other of said compartments over substantially the whole of the length of said one compartment in the longitudinal direction, said passage means being constructed and arranged such that when said container is installed in a vehicle and the brakes are applied transfer of fluid through said passage means from one of said compartments to another is limited to a minimum amount sufficient to prevent any resultant fluid level displacement during said brake application from uncovering one of said outlet ports.

10. A reservoir assembly as claimed in claim 9, wherein said baffle includes two limbs and said container wall has opposed side portions, free ends of said limbs being integrally connected to the wall of said container substantially where side portions of said wall intersect one end of said wall.

11. A reservoir assembly as claimed in claim 10, wherein said passage means comprises symmetrical notches in upper edges of said limbs of said baffle adjacent to their free ends and to said upper end of said wall of said container.

12. A reservoir assembly for a tandem master cylinder of an hydraulic braking system, said reservoir assembly comprising a container for hydraulic fluid defined by a continuous wall, said wall including opposed upper and lower ends, opposed front and rear ends and side portions connecting said ends, the upper end of said wall having a filler opening adapted to be closed by a removable cap, partition means dividing the container into separate compartments, said lower end of said wall having spaced outlet ports for connection to separate pairs of recuperation and compensation ports of a tandem master cylinder, said partition means comprising at least one rigid baffle extending between said side portions of said continuous wall from one of said front and rear ends of said wall towards the other of said ends, passage means between said continuous wall and said baffle, and including a portion permitting limited transfer of fluid between said compartments past said baffle, said baffle being shaped such that the lateral horizontal width of one of said compartments generally decreases in a direction towards the other of said compartments over substantially the whole of the length of said one compartment in the longitudinal direction, said passage means being constructed and arranged such that when said container is installed in a vehicle and the brakes are applied transfer of fluid through said passage means from one of said compartments to another is limited to a minimum amount sufficient to prevent any resultant fluid level displacement during said brake application from uncovering one of said outlet ports, a further baffle positioned in at least one of the compartments and shaped so as to resist movement of fluid in a lateral direction between side portions of said wall, said further baffle being of generally semicircular outline in plan and upstanding from said lower end of said wall of said container so as to surround one of said outlets.

* * * * *